(12) United States Patent
Kerrigan et al.

(10) Patent No.: US 9,319,148 B2
(45) Date of Patent: Apr. 19, 2016

(54) OPTICAL INTERCONNECTION TO AN INTEGRATED CIRCUIT

(71) Applicant: Lenovo Enterprise Solutions (Singapore) Pte. Ltd., Singapore (SG)

(72) Inventors: Brian M. Kerrigan, Cary, NC (US); Michael S. Miller, Raleigh, NC (US); Jonas R. Weiss, Hirzel (CH)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 358 days.

(21) Appl. No.: 13/632,687

(22) Filed: Oct. 1, 2012

(65) Prior Publication Data

US 2014/0093251 A1 Apr. 3, 2014

(51) Int. Cl.
*H04B 10/80* (2013.01)

(52) U.S. Cl.
CPC .................................... *H04B 10/801* (2013.01)

(58) Field of Classification Search
CPC ...................................................... H04B 10/801
USPC .................. 385/14; 712/1; 709/208
See application file for complete search history.

(56) References Cited

U.S. PATENT DOCUMENTS

| | | | |
|---|---|---|---|
| 6,325,552 B1 | 12/2001 | Brillhart | |
| 6,346,430 B1 | 2/2002 | Raj et al. | |
| 6,603,915 B2 * | 8/2003 | Glebov et al. | 385/129 |
| 6,690,845 B1 * | 2/2004 | Yoshimura et al. | 385/14 |
| 7,373,033 B2 | 5/2008 | Lu et al. | |
| 7,480,429 B1 | 1/2009 | Chiniwalla et al. | |
| 7,486,847 B1 | 2/2009 | Dellmann et al. | |
| 7,724,989 B2 | 5/2010 | Kodama et al. | |
| 7,734,125 B2 | 6/2010 | Kodama et al. | |
| 7,794,561 B2 | 9/2010 | Lamprecht et al. | |
| 8,536,693 B2 * | 9/2013 | Dungan et al. | 257/686 |

(Continued)

FOREIGN PATENT DOCUMENTS

| | | |
|---|---|---|
| DE | 112013004835 T5 | 6/2015 |
| JP | 2007293018 A | 11/2007 |

OTHER PUBLICATIONS

C. Berger et al., "Integration of Optical I/O With Organic Chip Packages", Micro-Optics 2008, Proceedings of SPIE, vol. 6992, pp. 1-9, 2008.

(Continued)

*Primary Examiner* — Peter Radkowski
(74) *Attorney, Agent, or Firm* — Law Office of Jim Boice

(57) ABSTRACT

A system comprises an interposer positioned between an integrated circuit and a system planar. An electrical/optical transceiver is coupled to the interposer, wherein the electrical/optical transceiver converts electrical signals into optical signals. The interposer comprises a first set of electrical conductors that is electrically coupled to non-Input/Output (I/O) electrical connectors on the integrated circuit, and wherein the first set of electrical conductors passes through the interposer to directly connect the non-I/O electrical connectors on the integrated circuit to the system planar. The interposer further comprises a second set of electrical conductors that is electrically coupled to input/output (I/O) electrical connectors on the integrated circuit, wherein the second set of electrical conductors traverses through the interposer to the electrical/optical transceiver to convert electrical I/O signals from the integrated circuit into optical I/O signals.

11 Claims, 4 Drawing Sheets

(56) References Cited

U.S. PATENT DOCUMENTS

| | | |
|---|---|---|
| 2002/0097962 A1 | 7/2002 | Yoshimura et al. |
| 2003/0067656 A1* | 4/2003 | Gentile ............ 359/158 |
| 2003/0103712 A1* | 6/2003 | Glebov et al. ............ 385/14 |
| 2003/0110339 A1* | 6/2003 | Calvignac et al. ............ 710/305 |
| 2004/0206988 A1* | 10/2004 | Glebov ............ 257/244 |
| 2006/0056765 A1 | 3/2006 | Hwang et al. |
| 2007/0292081 A1* | 12/2007 | Hashimoto et al. ............ 385/52 |
| 2008/0107374 A1 | 5/2008 | Bozso et al. |
| 2008/0124025 A1 | 5/2008 | Bozso et al. |
| 2008/0244052 A1* | 10/2008 | Bradicich et al. ............ 709/223 |
| 2010/0171023 A1 | 7/2010 | Asahi et al. |
| 2010/0195967 A1 | 8/2010 | Wang et al. |
| 2011/0016214 A1* | 1/2011 | Jackson ............ 709/226 |
| 2011/0044369 A1* | 2/2011 | Andry et al. ............ 372/50.124 |
| 2011/0108716 A1 | 5/2011 | Shiraishi |
| 2011/0134614 A1 | 6/2011 | Berger et al. |
| 2011/0217657 A1* | 9/2011 | Flemming et al. ............ 430/270.1 |
| 2012/0020027 A1* | 1/2012 | Dungan et al. ............ 361/718 |
| 2012/0189245 A1* | 7/2012 | Bowen et al. ............ 385/14 |

OTHER PUBLICATIONS

International Searching Authority: International Search Report and Written Opinion for International Application No. PCT/US2013/055621, Mailed November 26, 2013.

* cited by examiner

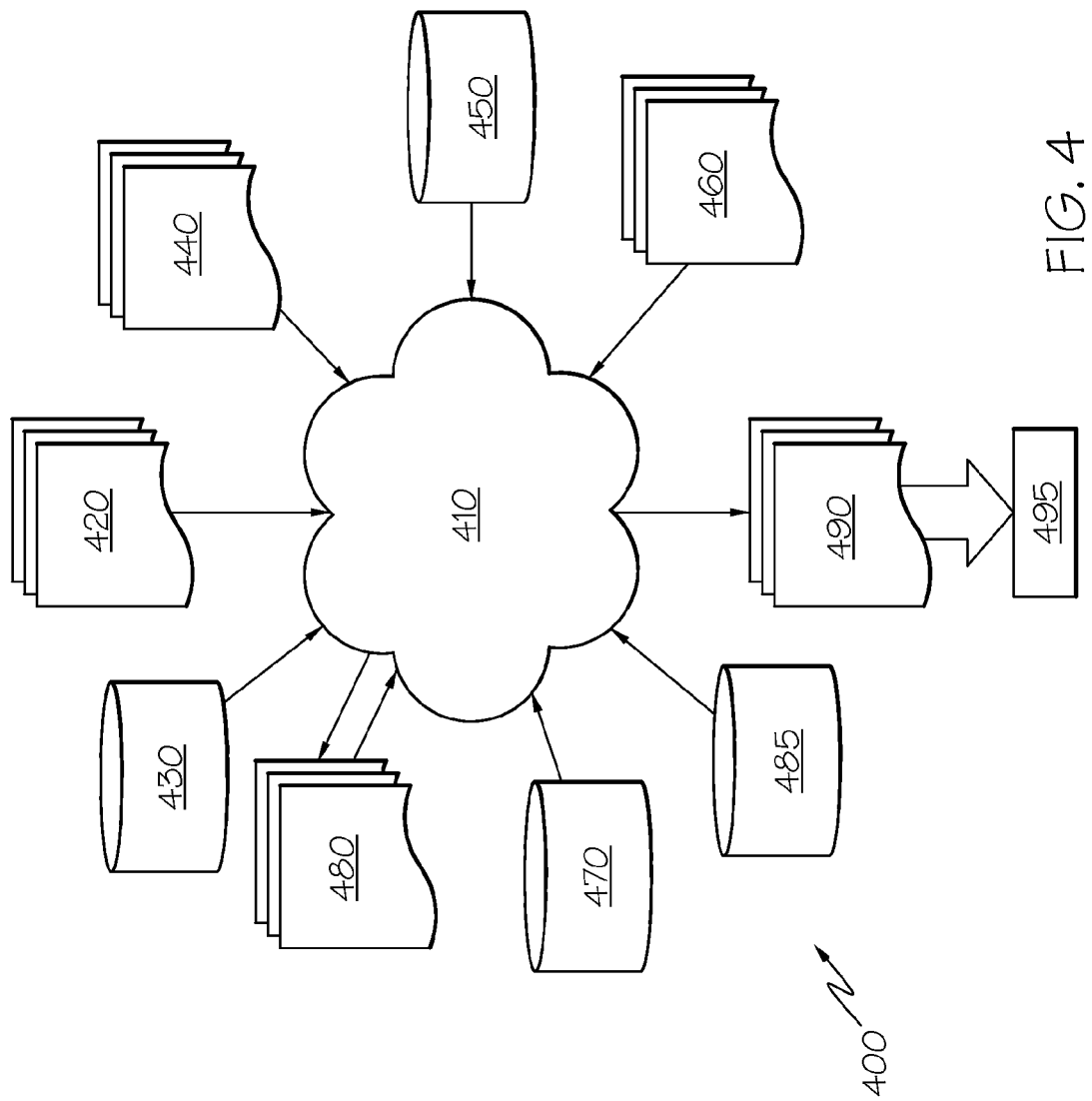

OPTICAL INTERCONNECTION TO AN INTEGRATED CIRCUIT

BACKGROUND

The present disclosure relates to the field of computing hardware, and specifically to integrated circuits in computing hardware. Still more specifically, the present disclosure relates to converting electrical input/output signals from an integrated circuit into optical input/output signals.

An integrated circuit is an electronic circuit produced by a combination of lithography, spattering, etc. to form the electronic circuit. This electronic circuit may include resistors, transistors, diodes, and other electronic components that collectively perform one or more types of functions. One type of specialized integrated circuit is a microprocessor, which provides the functionality of a computer's central processing unit (CPU) on a single integrated circuit by including a combination of input/output connections, processing units, memory, etc. on a single chip. Another type of specialized integrated circuit is a field-programmable gate array, which is a semiconductor device that is programmable after being manufactured to create a custom-configured circuit.

SUMMARY

In one embodiment, a system comprises an interposer positioned between an integrated circuit and a system planar. An electrical/optical transceiver is coupled to the interposer, wherein the electrical/optical transceiver converts electrical signals into optical signals. The interposer comprises a first set of electrical conductors that is electrically coupled to non-Input/Output (I/O) electrical connectors on the integrated circuit, and wherein the first set of electrical conductors passes through the interposer to directly connect the non-I/O electrical connectors on the integrated circuit to the system planar. The interposer further comprises a second set of electrical conductors that is electrically coupled to input/output (I/O) electrical connectors on the integrated circuit, wherein the second set of electrical conductors traverses through the interposer to the electrical/optical transceiver to convert electrical I/O signals from the integrated circuit into optical I/O signals.

In one embodiment, a hardware description language (HDL) design structure is encoded on a machine-readable data storage medium. The HDL design structure comprises elements that, when processed in a computer-aided design system, generate a machine-executable representation of a system. The system comprises an interposer positioned between an integrated circuit and a system planar. An electrical/optical transceiver is coupled to the interposer, wherein the electrical/optical transceiver converts electrical signals into optical signals. The interposer comprises a first set of electrical conductors that is electrically coupled to non-Input/Output (I/O) electrical connectors on the integrated circuit, and wherein the first set of electrical conductors passes through the interposer to directly connect the non-I/O electrical connectors on the integrated circuit to the system planar. The interposer further comprises a second set of electrical conductors that is electrically coupled to input/output (I/O) electrical connectors on the integrated circuit, wherein the second set of electrical conductors traverses through the interposer to the electrical/optical transceiver to convert electrical I/O signals from the integrated circuit into optical I/O signals.

In one embodiment, a system comprises a server chassis; a server blade mounted in the server chassis, wherein the server blade comprises an integrated circuit and a system planar; an interposer positioned between the integrated circuit and the system planar; an electrical/optical transceiver coupled to the interposer, wherein the electrical/optical transceiver converts electrical signals into optical signals; a first set of electrical conductors in the interposer, wherein the first set of electrical conductors is electrically coupled to non-Input/Output (I/O) electrical connectors on the integrated circuit, and wherein the first set of electrical conductors passes through the interposer to directly connect the non-I/O electrical connectors on the integrated circuit to the system planar; a second set of electrical conductors in the interposer, wherein the second set of electrical conductors is electrically coupled to input/output (I/O) electrical connectors on the integrated circuit, and wherein the second set of electrical conductors traverses through the interposer to the electrical/optical transceiver to convert electrical I/O signals from the integrated circuit into optical I/O signals; a poly-optical wave guide coupled to an output of the electrical/optical transceiver; and an optical receiver mounted on a backplane of the server chassis, wherein the optical I/O signals pass through the poly-optical wave guide to an optical receiver.

The above as well as additional objectives, features, and advantages of the present invention will become apparent in the following detailed written description.

BRIEF DESCRIPTION OF THE SEVERAL VIEWS OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 4 is a flow diagram of a design process used in semiconductor design, manufacturing, and/or testing of the presently described system depicted in exemplary FIGS. 2-3.

DETAILED DESCRIPTION

Figure 1:
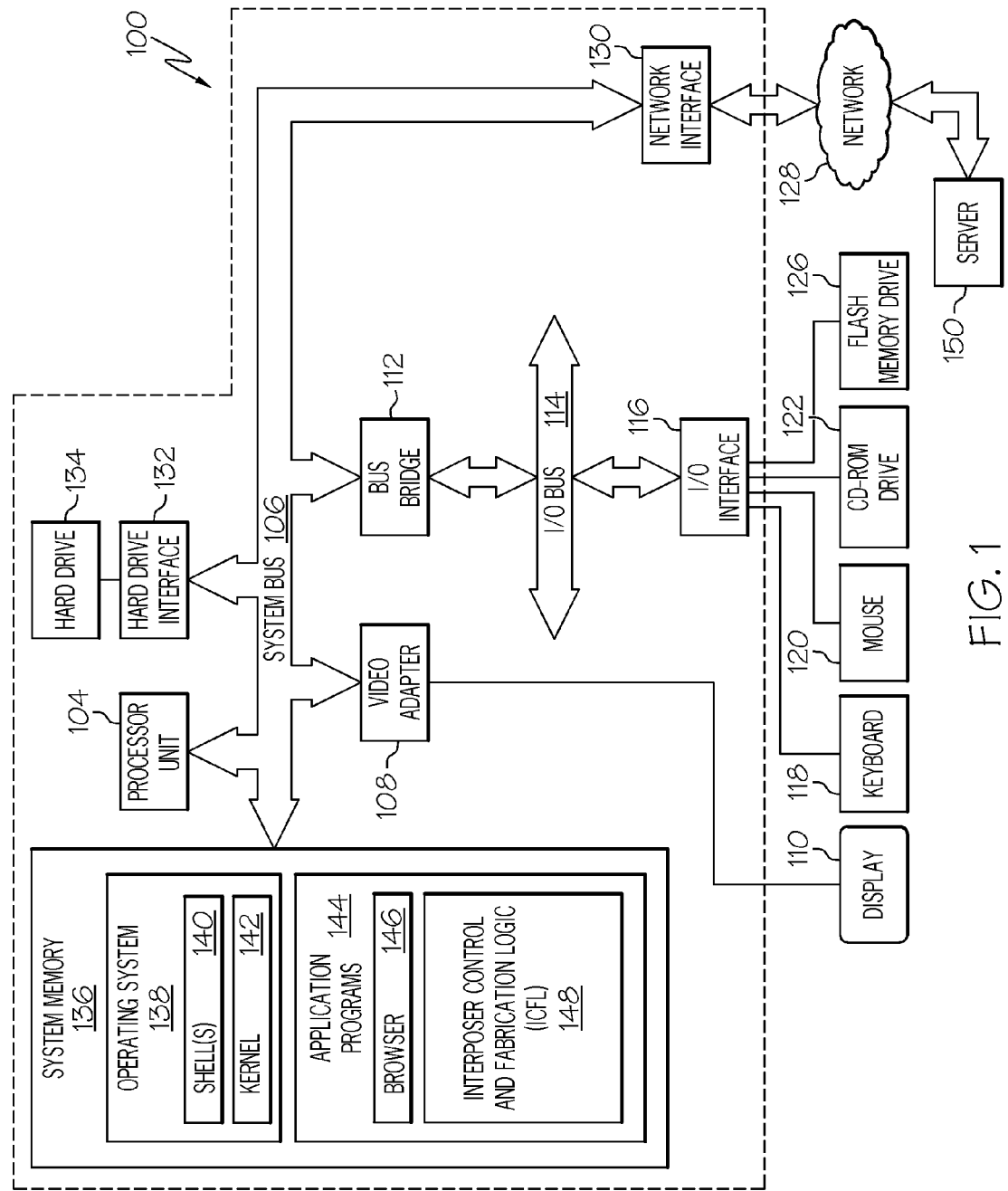
FIG. 1 depicts an exemplary physical computer in which the present invention may be implemented and/or utilized.

With reference now to FIG. 1, there is depicted a block diagram of an exemplary computer 100, with which and/or in which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN). Server 150 may be architecturally configured in the manner depicted for computer 100.

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries), also called a command processor in Windows® (WINDOWS is a registered trademark of Microsoft Corporation in the United States and other countries), is a program that provides an interpreter and an interface between the user and the operating system, and is generally the highest level of the operating system software hierarchy and serves as a command interpreter. Thus, shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also include an interposer control and fabrication logic (ICFL) 148, which, in one embodiment, controls and/or fabricates some or all of the systems depicted in FIGS. 2-3. Note that, in one embodiment, computer 100 also includes some or all of the system 200 and/or system 300 depicted in FIGS. 2-3. Note further that, in one embodiment, computer 100 is able to download ICFL 148 from service provider server 150, preferably in an "on demand" basis.

The hardware elements depicted in computer 100 are not intended to be exhaustive, but rather are representative to highlight essential components required by the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention. Note that the hardware architecture for service provider server 150 may be substantially similar to that shown for computer 100.

Figure 2:
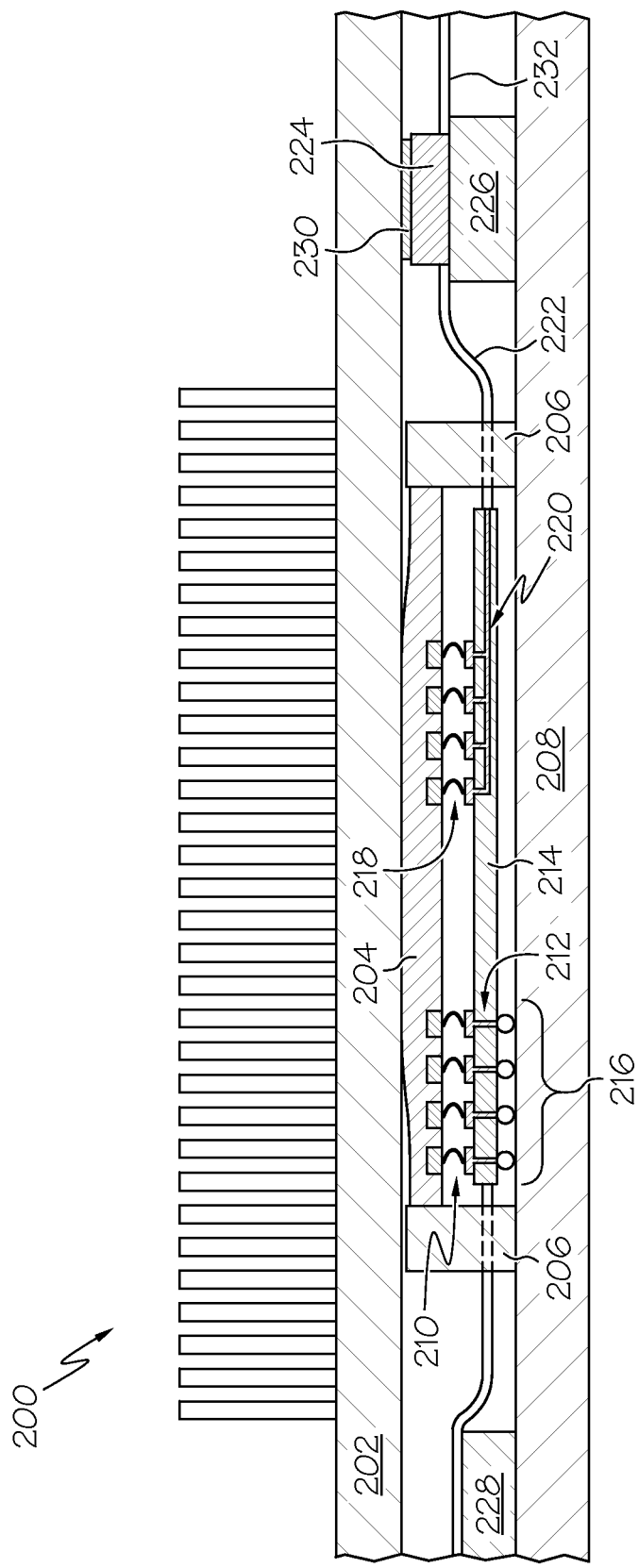
FIG. 2 illustrates a novel interposer according to one embodiment of the present invention.

Referring now to FIG. 2, presented therein is an exemplary system 200 that includes a novel interposer for selectively converting input/output (I/O) electrical signals into optical signals. System 200 includes a heat sink 202, which is thermally mounted against (i.e., abuts) an integrated circuit 204. This integrated circuit 204, which may be a microprocessor, a field-programmable gate array (FPGA), or any other type of integrated circuit, is supported by and/or mounted to a load module 206, which is connected to a system planar 208. System planar 208, also called a printed circuit board (PCB), provides mechanical support and electrical connections for electronic components (e.g., processors, multiplexers, resisters, diodes, power amplifiers, memory modules, etc.) that are mounted thereon. These connections are provided by a combination of printed wiring and associated connection points.

One surface (e.g., the underside surface) of the integrated circuit (IC) 204 has an array of electrical connector points, which are depicted for exemplary purposes as IC non-input/output (I/O) connectors 210 and IC I/O connectors 218. The IC non-I/O connectors 210 are electrically coupled to a first set of electrical conductors 212 within an interposer 214. This first set of electrical conductors 212 directly connects the IC non-I/O connectors 210 from IC 204 to system planar non-I/O connectors 216 on system planar 208. Note that the first set of electrical conductors 212 passes uninterrupted through the interposer 214 to directly connect non-I/O pins in the IC 204 to the system planar 208. The IC non-I/O connectors 210 (i.e., non-I/O pins) carry power, clock signals, memory accesses, etc. As the name indicates, a non-I/O signal is anything that is not an I/O signal. Non-I/O signals are those signals that are not I/O signals, and include power to the computer 100 shown in FIG. 1; internal clock signals for the processor unit 104; system bus 106; internal memory communication (e.g., between the processor unit 104 and the system memory 136); etc. That is, non-I/O signals are signals within the computer 100 plus power to the computer 100.

The IC I/O connectors 218 coming out of the IC 204 carry I/O signals to and from the IC 204. I/O signals are defined as a communication between a computer (e.g., computer 100 shown in FIG. 1) and a device/resource that is external to that computer. For example, I/O signals may be sent between computer 100 and a display 110, an input device such as keyboard 118 or mouse 120, or an external memory device such as a CD-ROM drive 122 or flash memory drive 126, all depicted in FIG. 1. I/O signals may also be those signals that are sent between a network 128 (also shown in FIG. 1), and thus are for any resource that is coupled to that network 128.

Thus, in FIG. 2, I/O signals from the IC 204 are handled by a second set of electrical conductors 220, which are within the interposer 214, and which are electrically coupled to IC I/O electrical connectors 218 on the IC 204. This second set of electrical conductors 220 is devoted to carrying only I/O signals, as defined above. As depicted in FIG. 2, the second set of electrical conductors 220 traverses through the interposer 214 to an electrical/optical transceiver 224 via a post-interposer electrical conductor 222. Note that the I/O signals traveling through the post-interposer electrical conductor 222 are still in the same electronic state (i.e., are carried by electrons) as when coming to/from the IC 204. However, when these electronic I/O signals pass through an electrical/optical transceiver 224, they are converted into optical signals (i.e., are now carried by photons) for further transmission via a poly-optical wave guide 232 (e.g., a fiber optic cable). Note that the electrical/optical transceiver 224 is supported by a rigid-flex sheet mount 226, and is thermally coupled to the heat sink 202 by a thermal interface material 230 (e.g., thermal grease).

In one embodiment, the interposer 214, the electrical/optical transceiver 224, the first set of electrical conductors 212, the second set of electrical conductors 220, and the poly-optical wave guide 224 are all integrated into a single rigid-flex sheet, which is a polycarbonate based sheet that is supported by the rigid-flex sheet mount 226 and a rigid-flex sheet mount 228 as depicted.

In one embodiment, the interposer 214 is electrically coupled to the integrated circuit 204 by a land grid array (LGA) of electrical connectors (not shown). Thus, the quantity of connectors described by elements 210 and 218 are for illustrative purposes only, and are not to be interpreted as limiting the number of connectors between the IC 204 and the interposer 214.

Note that, as described herein, in one embodiment the optical I/O signals bypass the system planar 208. Thus, there is no need to modify the system planar 208 to be able to handle optical signals, since this is handled by the rigid-flex sheet (which includes the electrical/optical transceiver 224 described herein). Rather, this rigid-flex sheet provides the components and logic required to selectively handle I/O and non-I/O signals to and from the IC 204 using different pathways. That is, in this embodiment the I/O signals to and from IC 204 never reach the system planar 208 and are handled by logic within the interposer 214, while the non-I/O signals to/from IC 204 are sent directly to the system planar 208 and bypass any logic within the interposer 214.

Figure 3:
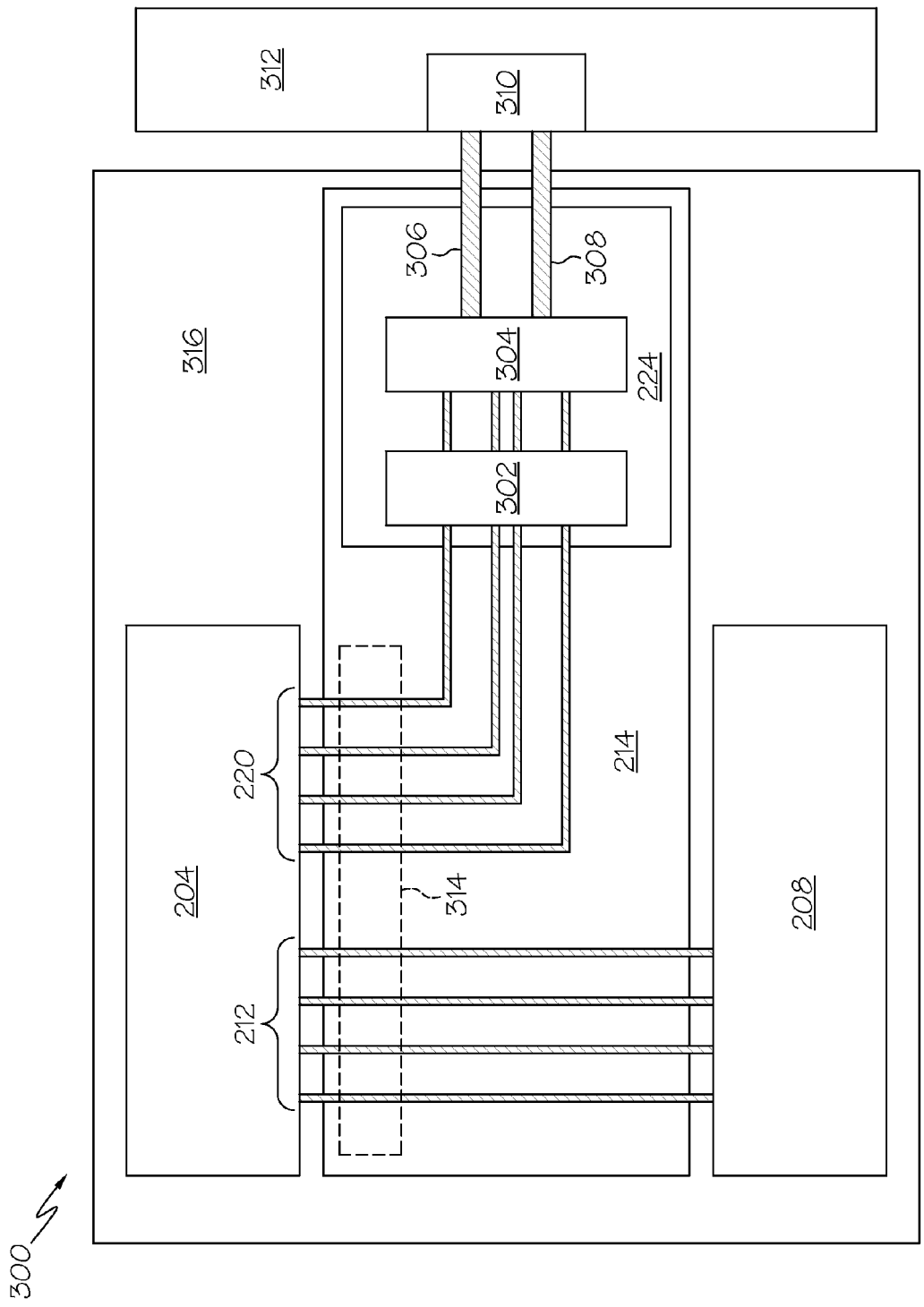
FIG. 3 depicts additional detail of the interposer presented in FIG. 2.

With reference now to FIG. 3, additional detail of the interposer 214 presented in FIG. 2 and other system components in a system 300 is presented. As described in FIG. 2, the first set of electrical conductors 212 that carry non-I/O signals directly connect the non-I/O pins on the IC 204 to non-I/O connections in the system planar 208. However, the second set of electrical connectors 220 carry I/O signals (to and from I/O pins on the IC 204) to the electrical/optical transceiver 224. The electrical/optical transceiver 224 includes an electrical/optical converter 302, which converts electronic signals into optical signals, and also converts optical signals back into electronic signals. The electronic signals may be converted to optical signals by transmitting the electronic signals to a light source (e.g., a high-speed light emitting diode—not shown). The optical signals may be converted to electronic signals by shining the optical signals on a photoreceptor (also not shown), which "reads" flashes of light as binary and/or analog information signals. Note that these types of electrical/optical converters are for exemplary purposes only, and are not to be construed as limiting the scope of the present invention.

Once electronic signals have been converted into optical signals by the electrical/optical converter, in one embodiment these optical signals can be "mixed" into a poly-optical signal by an optical mixer/splitter 304. That is, different wavelengths of optical signals coming out of the electrical/optical converter 302 are mixed into a poly-optical signal for transmission to an optical receiver 310 via an outbound poly-optical wave guide 306. Incoming optical signals from the optical receiver 310, which are sent to the optical mixer/splitter 304 via an inbound poly-optical wave guide 308, are split apart by the optical mixer/splitter 304. These split optical signals are then sent to the electrical/optical converter 302, where they are converted into separate electronic signals for transmission to the IC 204 via the I/O second set of electronic conductors 220. In an alternate embodiment, the outbound poly-optical wave guide 306 and the inbound poly-optical wave guide 308 are combined into a single wave guide (not shown). In this alternate embodiment, the optical mixer/splitter 304 includes logic for determining whether the optical signals are incoming or outgoing, and handles (i.e., transmits) them accordingly.

Note that in one embodiment, the IC 204 and other components depicted in FIG. 3 are part of a server blade 316, which is mounted in a blade chassis (not shown). This server blade 316 is defined as a system that comprises a processor, system memory, local cache memory, and an I/O interface. In one embodiment, mass storage, a power supply, and other components associated with a traditional computer/server are not on the server blade, but rather are located on other blades or components within, or external to, the blade chassis. One component of the blade chassis is a backplane 312, which holds a group of connectors that mate with the server blades that are held in the blade chassis. Thus, in this embodiment, IC 204, interposer 214, electrical/optical transceiver 224, and system planar 208 are all part of the server blade 316, which is mounted onto a rack in the server chassis. In this embodiment, then, the optical receiver 310, which is mounted on the backplane 312 of the server chassis, is electrically coupled to the electrical/optical transceiver 224 via the outbound poly-optical wave guide 306 and/or the inbound poly-optical wave guide 308.

In one embodiment, the only electrical I/O signals that are converted into optical I/O signals are those that are destined for components that are remote to (i.e., are not mounted on) server blade 316. That is, for purposes of scalability and speed, only electrical I/O signals that are destined for a remote processor, memory, I/O device, etc. on another system (i.e., are not part of server blade 316) are converted into optical I/O signals. In this embodiment, then, electrical I/O signals to other components (including memory, co-processors, etc.) that are also mounted on the system planar 208 with the IC 204 will be communicated directly to the system planar 208, using the same type of direct connectors as the first set of electrical conductors 212 which were used for non-I/O signals.

In one embodiment, only electrical I/O signals that are destined for devices that have been pre-designated as being "high-speed" (e.g., processors, memory, etc.) on other systems (e.g., blades, a cloud, etc.) are converted into optical I/O signals, using the system and process described herein, for transmission to the optical receiver 310. However, electrical I/O signals that are destined for devices that have been pre-designated as being "low-speed" (e.g., a keyboard, a mouse, etc.), whether part of the server blade 316 or part of a remote system, remain electric, and are sent directly to the system planar 208.

In one embodiment, the pre-designated high-speed devices are remote devices that are part of a cloud computing system. A cloud system uses a combination of hardware and software that is delivered as a service over a network such as the Internet. That is, physically disparate hardware and software are used in combination to provide better and faster service via a network. Components of the cloud system, in one embodiment, increase bandwidth and data transfer rate using the system described herein.

In one embodiment, the server chassis contains multiple server blades. In this embodiment, the pre-designated high-speed devices are remote devices that are part of another server blade, and not the server blade that contains the IC 204 described herein. Electrical I/O signals from IC 204 that are directed to pre-designated high-speed devices on another server blade in the same server chassis are converted into optical I/O signals, using the system and process described herein, for transmission to the optical receiver 310.

As described above, the different pathways for the first (non-I/O) and second (I/O) electrical conductors in the interposer 214 are hardwired within the interposer 214. However, in an alternate embodiment, an electrical conductor multiplexer 314 within the interposer 214 segregates the first set of electrical conductors 212 from the second set of electrical conductors 220 in the interposer 214. That is, all electrical connectors to the IC 204 feed into the electrical conductor multiplexer 314, which then determines which of the lines are for non-I/O signals and which are for I/O signals. This determination may be performed by reading the signal and determining its type. For example, a power signal will have a very different signal than an I/O signal. This difference is detected by the electrical conductor multiplexer 314, which then sends the signal to either the system planar 208 (if the signal is non-I/O) or the electrical/optical transceiver 224 (if the signal is I/O).

With reference now to FIG. 4, there is depicted a block diagram of an exemplary design flow 400 used for example, in semiconductor IC logic design, simulation, testing, layout, and manufacturing. Design flow 400 includes processes, machines and/or mechanisms for processing design structures or devices to generate logically or otherwise functionally equivalent representations of the design structures and/or devices described above and shown in FIGS. 2-3. The design structures processed and/or generated by design flow 400 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 400 may vary depending on the type of representation being designed. For example, a design flow 400 for building an application specific IC (ASIC) may differ from a design flow 400 for designing a standard component or from a design flow 400 for instantiating the design into a programmable array, for example a programmable gate array (PGA) or a field programmable gate array (FPGA) offered by Altera® Inc. or Xilinx® Inc.

FIG. 4 illustrates multiple such design structures including an input design structure 420 that is preferably processed by a design process 410. Design structure 420 may be a logical simulation design structure generated and processed by design process 410 to produce a logically equivalent functional representation of a hardware device. Design structure 420 may also or alternatively comprise data and/or program instructions that when processed by design process 410, generate a functional representation of the physical structure of a hardware device. Whether representing functional and/or structural design features, design structure 420 may be generated using electronic computer-aided design (ECAD) such as implemented by a core developer/designer. When encoded on a machine-readable data transmission, gate array, or storage medium, design structure 420 may be accessed and processed by one or more hardware and/or software modules within design process 410 to simulate or otherwise functionally represent an electronic component, circuit, electronic or logic module, apparatus, device, or system such as those shown in FIGS. 2-3. As such, design structure 420 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 410 preferably employs and incorporates hardware and/or software modules for synthesizing, translating, or otherwise processing a design/simulation functional equivalent of the components, circuits, devices, or logic structures shown in FIGS. 2-3 to generate a netlist 480 which may contain design structures such as design structure 420. Netlist 480 may comprise, for example, compiled or otherwise processed data structures representing a list of wires, discrete components, logic gates, control circuits, I/O devices, models, etc. that describes the connections to other elements and circuits in an integrated circuit design. Netlist 480 may be synthesized using an iterative process in which netlist 480 is resynthesized one or more times depending on design specifications and parameters for the device. As with other design structure types described herein, netlist 480 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 410 may include hardware and software modules for processing a variety of input data structure types including netlist 480. Such data structure types may reside, for example, within library elements 430 and include a set of commonly used elements, circuits, and devices, including models, layouts, and symbolic representations, for a given manufacturing technology (e.g., different technology nodes, 32 nm, 45 nm, 50 nm, etc.). The data structure types may further include design specifications 440, characterization data 450, verification data 460, design rules 470, and test data files 485 which may include input test patterns, output test results, and other testing information. Design process 410 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 410 without deviating from the scope and spirit of the invention. Design process 410 may also include modules for performing standard circuit design processes such as timing analysis, verification, design rule checking, place and route operations, etc.

Design process 410 employs and incorporates logic and physical design tools such as HDL compilers and simulation model build tools to process design structure 420 together with some or all of the depicted supporting data structures along with any additional mechanical design or data (if applicable), to generate a second design structure 490. Design structure 490 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 420, design structure 490 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 2-3. In one embodiment, design structure 490 may comprise a compiled, executable HDL simulation model that functionally simulates the devices shown in FIGS. 2-3.

Design structure 490 may also employ a data format used for the exchange of layout data of integrated circuits and/or symbolic data format (e.g. information stored in a GDSII (GDS2), GL1, OASIS, map files, or any other suitable format for storing such design data structures). Design structure 490 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 2-3. Design structure 490 may then proceed to a stage 495 where, for example, design structure 490: proceeds to tape-out, is released to manufacturing, is released to a mask house, is sent to another design house, is sent back to the customer, etc.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A system comprising:
    an interposer positioned between an integrated circuit and a system planar;
    an electrical/optical transceiver coupled to the interposer, wherein the electrical/optical transceiver converts electrical signals into optical signals;
    a first set of electrical conductors in the interposer, wherein the first set of electrical conductors is electrically coupled to integrated circuit (IC) non-Input/Output (I/O) electrical connectors on the integrated circuit, and wherein the first set of electrical conductors passes through the interposer to directly connect the IC non-I/O electrical connectors on the integrated circuit to the system planar; and
    a second set of electrical conductors in the interposer, wherein the second set of electrical conductors is electrically coupled to IC input/output (I/O) electrical connectors on the integrated circuit, and wherein the second set of electrical conductors traverses through the interposer to the electrical/optical transceiver to convert electrical I/O signals from the integrated circuit into optical I/O signals, wherein only the electrical I/O signals that are destined for a remote device that has been designated as a remote high-speed device are converted into the optical I/O signals, and wherein the remote high-speed device is not mounted on the server blade.

2. The system of claim 1, wherein the optical I/O signals bypass the system planar.

3. The system of claim 1, further comprising:
    a poly-optical wave guide coupled to an output of the electrical/optical transceiver, wherein the optical I/O signals pass through the poly-optical wave guide to an optical receiver.

4. The system of claim 3, wherein the system is mounted on a server blade in a server chassis, and wherein the optical receiver is mounted on a backplane of the server chassis.

5. The system of claim 4, wherein the remote high-speed device is mounted on another server blade in the server chassis.

6. The system of claim 4, wherein the remote high-speed device is part of a cloud computing system.

7. The system of claim 3, wherein the interposer, the electrical/optical transceiver, the first set of electrical conductors, the second set of electrical conductors, and the poly-optical wave guide are all integrated into a single rigid-flex sheet that is supported by a mount on the system planar, and wherein the interposer is electrically coupled to the integrated circuit by a land grid array (LGA) of electrical connectors.

8. The system of claim 7, wherein the integrated circuit is a microprocessor.

9. The system of claim 7, wherein the integrated circuit is a field-programmable gate array (FPGA).

10. The system of claim 1, further comprising:
    an electrical conductor multiplexer within the interposer, wherein the electrical conductor multiplexer segregates the first set of electrical conductors from the second set of electrical conductors in the interposer.

11. A system comprising:
    an interposer positioned between an integrated circuit and a system planar;

an electrical/optical transceiver coupled to the interposer, wherein the electrical/optical transceiver converts electrical signals into optical signals;

a first set of electrical conductors in the interposer, wherein the first set of electrical conductors is electrically coupled to integrated circuit (IC) non-Input/Output (I/O) electrical connectors on the integrated circuit, and wherein the first set of electrical conductors passes through the interposer to directly connect the IC non-I/O electrical connectors on the integrated circuit to the system planar;

a second set of electrical conductors in the interposer, wherein the second set of electrical conductors is electrically coupled to IC input/output (I/O) electrical connectors on the integrated circuit, and wherein the second set of electrical conductors traverses through the interposer to the electrical/optical transceiver to convert electrical I/O signals from the integrated circuit into optical I/O signals; and an electrical conductor multiplexer within the interposer, wherein the electrical conductor multiplexer segregates the first set of electrical conductors from the second set of electrical conductors in the interposer.

* * * * *